(12) United States Patent
Friedrich et al.

(10) Patent No.: US 8,770,854 B2
(45) Date of Patent: Jul. 8, 2014

(54) ROLLING ELEMENT CAGE

(75) Inventors: Peter Friedrich, Auernheim (DE); Michael Krüger, Schweinfurt (DE); Steffen Säbsch, Weisendorf (DE); Heinz Schäfers, Erlangen (DE); Matthias Fick, Schnaittach (DE); Manfred Winkler, Aurachtal (DE); Johannes Enders, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/001,085

(22) PCT Filed: Dec. 2, 2011

(86) PCT No.: PCT/EP2011/071648
§ 371 (c)(1),
(2), (4) Date: Sep. 17, 2013

(87) PCT Pub. No.: WO2012/113472
PCT Pub. Date: Aug. 30, 2012

(65) Prior Publication Data
US 2014/0010490 A1    Jan. 9, 2014

(30) Foreign Application Priority Data
Feb. 24, 2011 (DE) .................. 10 2011 004 687

(51) Int. Cl.
*F16C 33/54* (2006.01)

(52) U.S. Cl.
USPC .......................................... 384/579

(58) Field of Classification Search
CPC .. F16C 33/4658; F16C 33/4464; F16C 33/54; F16C 33/542; F16C 33/547; F16C 33/548
USPC .................. 384/572, 573, 575, 578, 579; 29/898.065, 898.067
See application file for complete search history.

(56) References Cited

U.S. PATENT DOCUMENTS

| | | | |
|---|---|---|---|
| 3,473,857 A | 10/1969 | Pitner | 308/217 |
| 3,902,772 A * | 9/1975 | Spate | 384/579 |
| 5,528,706 A * | 6/1996 | Harimoto et al. | 384/573 |

FOREIGN PATENT DOCUMENTS

| | | | | |
|---|---|---|---|---|
| DE | 1 675 083 A1 | 4/1971 | | |
| DE | 10 2007 44 946 A1 | 4/2009 | | |
| GB | 2103307 A * | 2/1983 | | F16C 33/54 |

* cited by examiner

*Primary Examiner* — Phillip A Johnson
(74) *Attorney, Agent, or Firm* — Fitzpatrick, Cella, Harper & Scinto

(57) ABSTRACT

The invention concerns a rolling element cage (32) made of a metal strip material that is profiled, stamped, cut to length, and bent into a round shape, wherein the ends of the cut-to-length strip sections are joined together by welding. In order to make it possible to influence the lubricant distribution in the bearing and the vibration characteristics of the cage and thus of the overall bearing system, according to the invention the strip section ends (34, 36) are joined together with a predetermined axial offset (a) and/or radial offset (b).

5 Claims, 2 Drawing Sheets

ROLLING ELEMENT CAGE

CROSS REFERENCE TO RELATED APPLICATION

The present application is a national-stage entry under 35 U.S.C. §371 of International Application No. PCT/EP2011/071648 filed on Dec. 2, 2011, and claims the benefit of foreign priority under 35 U.S.C. §119(a)-(d) of German Application No. 10 2011 004 687.9, filed on Feb. 24, 2011.

FIELD OF THE INVENTION

The invention concerns a rolling element cage made of a metal strip material that is profiled, stamped, cut to length, and bent into a round shape, wherein the ends of the cut-to-length strip sections are joined together by welding.

BACKGROUND OF THE INVENTION

With rolling element cages of this type, in order to avoid asymmetries and resulting imbalances as well as sharp-edged projections that can come to rest against the applicable running partner of the cage, for example an outer bearing ring, the rolling element cages are manufactured in such a way that the ends of the strip sections are joined together without any axial or radial offset to the greatest degree possible, which is to say that the cages are rotationally symmetrical as well as radially and axially smooth. A mandrel, for example, is used for this purpose (or, according to DE 10 2007 044,946 A1, the crankshaft journal that is to accommodate the rolling bearing); the bent strip section is placed thereon in such a manner that the strip section ends rest flush against one another, and these ends are welded thereon in an offset-free manner.

In the past, as long as rolling element cages could not be produced so as to be fully smooth at least radially and axially, care was taken to ensure that the weld seam regions could not come into direct contact with associated opposing parts.

Thus, DE 1,675,083 A1 discloses a cage for a radial needle bearing or radial roller bearing of the type specified in the preamble of claim 1, in which the ends of the edges (rims) joined together by welding are for their part offset radially in a direction opposite to the radial offset of the edges, so that the weld seam on one side of the cage is radially recessed from the corresponding cylindrical surface. This design of the cage achieves the result that only undistorted regions ensure centering of the cage on the adjacent race, without the weld seam being able to come into contact with the race.

However, it has been shown that with a symmetrical and smooth design of the cage, in many cases a disadvantageous lubricating oil distribution is established and cannot be influenced in any way. Especially in the case of bearings with lubricant starvation and slow rotational motions, in some technical applications a different oil distribution is desired in the bearing than is actually taking place. In bearings with grease lubrication, especially if they run very infrequently, it is possible for the grease to be forced out of the rolling contact over time, and no longer return to the rolling contact in sufficient quantity even during operation, which can lead to early bearing damage.

Furthermore, the vibration characteristics of absolutely rotationally symmetrical rolling element cages, and thus their influence on the vibration characteristics of the overall system, are fixed by the symmetry, which in some cases results in suboptimal system characteristics.

OBJECT OF THE INVENTION

The object of the invention is to create a rolling element cage of the type specified in the preamble of claim 1 that makes it possible to systematically influence the distribution of lubricating oil or grease in the bearing, as well as the vibration characteristics thereof.

SUMMARY OF THE INVENTION

The invention is based on the finding that in operating conditions deviating from standard operating conditions, it may be useful to relinquish the rotationally symmetrical design, desired per se, of rolling element cages or to alter it in the sense of an intentional asymmetry in order to exert an influence on the lubricant distribution and/or vibration characteristics of a bearing.

The invention thus starts from a rolling element cage made of a metal strip material that is profiled, stamped, cut to length, and bent into a round shape, wherein the ends of the cut-to-length strip sections are joined together by welding. Provision is made here according to the invention that the strip section ends located at the periphery of the cage have a predetermined axial and/or radial offset from one another. Since such an offset can be produced in the course of the production step of welding that is required in any case, the above-described desired effect can be achieved according to the invention without any additional production steps.

In the case of a bearing with lubricant starvation and slow rotational motions, a different oil distribution in the bearing can be achieved in a targeted manner by this cage geometry. In a cage supported by rolling elements and having a radial offset of the strip section ends, oil can be forced radially inward or radially outward depending on the direction of rotation. With an axial offset of the strip section ends, oil is forced or "pumped" to one axial side or the other depending on the direction of rotation.

In a bearing with grease lubrication, the lubricating grease is more strongly moved or "pumped" by the altered cage geometry. In this way, more regions in the bearing can be supplied with grease. With a radial offset of the strip section ends, the grease is forced radially inward or radially outward depending on the direction of rotation, whereas with an axial offset of the strip section ends it is forced to one side or the other depending on the direction of rotation.

Moreover, the vibration characteristics of the bearing cage can be influenced as needed by its asymmetrical design, which is to say that the bearing can be "detuned" relative to a bearing equipped with a symmetrical cage, by which means the vibration characteristics of the overall system, e.g., a machine, a transmission, etc., can be influenced. As a result of the welding offset, the rolling elements in this location and the adjacent locations are not guided or held uniformly. This results in a different excitation of the rolling elements and the cage at speed, as a result of which the frequencies of the individual components in the bearing differ. In this way, for example, the noise can be displaced from one frequency to another, or the frequency range can be changed from a narrow frequency range to a wider frequency range. This can result in a desired and positive detuning of the vibration characteristics of the overall system (e.g., a transmission, a machine, etc.).

The invention can be implemented economically and quickly, which is to say by simple replacement of the bearing cage.

In a prevalent cage design with at least one rim section bent radially inward at essentially right angles, provision is made in accordance with another embodiment of the invention for an axial offset to be equal to at most half of the axial thickness of the rim section, so that sufficient area remains for mutual welded joining of the ends of the strip sections.

For a cage with at least one rim section located in a circumferential surface of the cage, provision is correspondingly made according to the invention for a radial offset to be equal to at most half of the radial thickness of the rim section.

A preferred embodiment of the invention provides for the cage to consist of a single strip section bent into a circle, the two ends of which are joined to one another. In this case, there is a location on the circumference of the rolling element cage, namely the location where the ends of the strip section are joined, that can cause the above-described effects as a result of an offset of the strip section ends.

In accordance with another embodiment of the invention, the cage consists of multiple strip sections in the form of segments of a circle, which are joined into a circular cage at their strip section ends. In this case, a number of locations corresponding to the number of strip sections are produced, distributed over the circumference of the finished cage, at which the above-described effects are produced. Accordingly, the above-described effects can be achieved in a targeted manner to a greater or lesser degree as a result of the selection of the number of strip sections joined to form a circular cage.

BRIEF DESCRIPTION OF THE DRAWINGS

The rolling element cage designed according to the invention is explained in detail below in multiple preferred embodiments with reference to the attached drawings. Shown are.

DETAILED DESCRIPTION OF THE DRAWINGS

Figure 1:
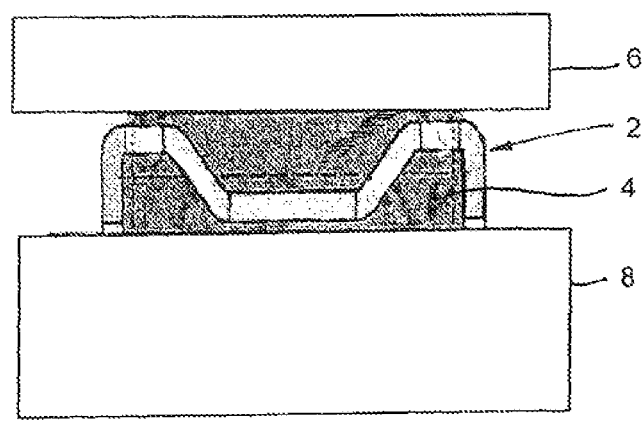
FIG. 1 a cross-section through a cage profile according to the prior art.

Accordingly, FIG. 1 shows a longitudinal profile cross-section of a conventional rolling element cage 2, here a needle cage, that is equipped with rolling elements 4 and is arranged between an outer bearing ring 6 and a shaft 8. The rolling element cage 2 has a shape in profile approximating the letter M and, in a known manner, ensures axially parallel guidance and mutual spacing of the rolling elements in the circumferential direction. The rolling element cage itself is radially guided on the running partners (bearing ring 6, shaft 8).

Figure 2:
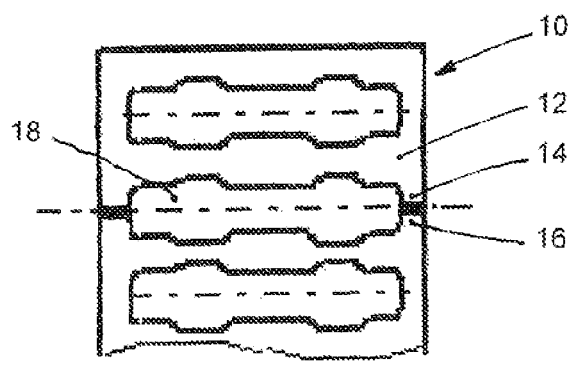
FIG. 2 a partial top view of a rolling element cage from FIG. 1.

FIG. 2 shows a partial top view of a rolling element cage 10 similar to that in FIG. 1, made of a metal strip section 12 that is profiled, stamped, cut to length, and bent into a round shape, and whose strip section ends 14, 16 are joined together with no offset by welding in the region of a punched-out rolling element pocket 18, which is to say essentially the rim axially bordering the cage.

Figure 3:
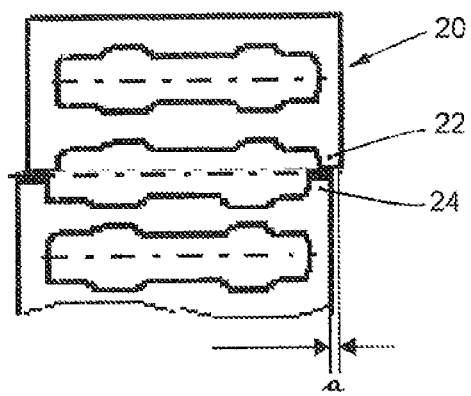
FIG. 3 a view approximately similar to that in FIG. 2, with an axial offset of the strip section ends, FIG. 4 a profile cross-section through a rolling element cage, with a radial offset of the strip section ends, and FIG. 5 a view approximately similar to that in FIG. 4, with a radial and an axial offset of the strip section ends.

FIG. 3 shows a rolling element cage 20 similar to that in FIG. 2, but where the strip section ends 22, 24 are joined together with an axial offset a (relative to the direction of the longitudinal axis).

Figure 4:
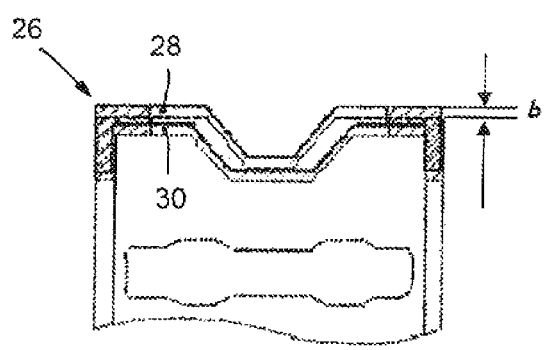

FIG. 4 shows a longitudinal profile cross-section through a rolling element cage 26 in which the strip section ends 28, 30 are joined together with a radial offset b.

Figure 5:
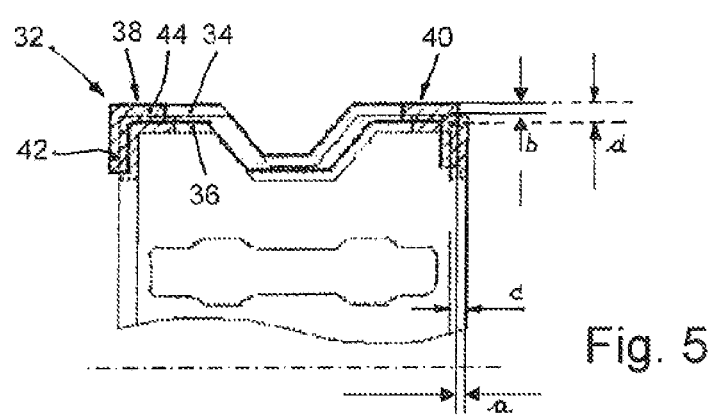

FIG. 5 shows a rolling element cage 32 approximately similar to that in FIG. 4, where the strip section ends 34, 36 are joined together with an axial offset a and a radial offset b.

The longitudinal cross-sectional profile of the rolling element cages 26 and 32 are essentially M-shaped as in FIG. 1. The rims 38 and 40 (see FIG. 5) axially bordering the rolling element pockets 18 each have a flange-like rim section 42 bent radially inward at right angles and a rim section 44 that lies in a circumferential surface of the cage. In order to ensure that the end faces of the strip section ends 34, 36 that still overlap despite the offset are sufficient for a secure welded connection, the axial offset a should be equal to at most one half of the axial thickness c of the rim section 42, and the radial offset b should be equal to at most one half of the radial thickness d of the rim section 44.

It should be noted again here that each of the cages can consist of a single strip section bent into a circle, the two ends of which are joined together, or else, as not shown here in detail, can consist of multiple strip sections in the form of segments of a circle that are joined at their strip section ends to form a circular cage.

LIST OF REFERENCE NUMERALS 2 rolling element cage
4 rolling element
6 outer bearing ring
8 shaft
10 rolling element cage
12 metal strip section
14 strip section end
16 strip section end
18 rolling element pocket
20 rolling element cage
22 strip section end
24 strip section end
26 rolling element cage
28 strip section end
30 strip section end
32 rolling element cage
34 strip section end
36 strip section end
38 rim
40 rim
42 rim section
44 rim section
a axial offset
b radial offset
c thickness of 42
d thickness of 44

The invention claimed is:

1. Rolling element cage made of a metal strip material that is profiled, stamped, cut to length, and bent into a round shape, wherein ends of cut-to-length strip sections are joined together by welding, wherein the strip section ends have a predetermined axial offset (a) and/or radial offset (b) from one another.

2. Rolling element cage according to claim 1, wherein the cage has at least one rim section bent radially inward at essentially right angles, wherein an axial offset (a) is equal to at most half of an axial thickness (c) of the rim section.

3. Rolling element cage according to claim 1 with at least one rim section located in a circumferential surface of the cage, wherein a radial offset (b) is equal to at most half the radial thickness (d) of the rim section.

4. Rolling element cage according to any of claim 1, wherein the rolling element cage consists of a single strip section bent into a circle, two strip section ends of which are joined to one another.

5. Rolling element cage according to any of claim 1, wherein the rolling element cage consists of multiple strip sections in the form of segments of a circle, which are joined into a circular cage at their strip section ends.

* * * * *